United States Patent Office 3,189,582
Patented June 15, 1965

3,189,582
POLYMERIZATION PROCESS FOR POLYVINYL-
IDENE CHLORIDE AND COPOLYMERS THERE-
OF USING AN INSOLUBLE METALLIC SOAP AS
SOLE EMULSIFIER
Frank J. Donat, Cleveland, and Edwin H. Baker,
Cuyahoga Falls, Ohio, assignors to The B. F. Goodrich
Company, New York, N.Y., a corporation of New York
No Drawing. Filed Mar. 16, 1962, Ser. No. 180,312
17 Claims. (Cl. 260—85.5)

This invention relates to emulsion type vinylidene chloride resins and more particularly pertains to spherical, uniform particle size vinylidene chloride resins and to a process for preparing same in an aqueous emulsion comprising the use of insoluble soaps as the sole emulsifiers.

The chemical literature reveals that few methods have been suggested for the provision of uniform particle size vinylidene chloride resins. British Patent 627,265 suggests that a uniform particle size resin can be prepared from a "seed" latex. Here, monomer, water, catalyst and conventional soap were added to a previously prepared latex and the resulting mixture polymerized. In this highly critical technique care must be taken in the addition of the conventional soap so that no new polymer particles are initiated in the subsequent polymerization.

There are many, diverse uses for a spherical, uniform particle size vinylidene chloride resin. For example, spherical, uniform particle size vinylidene chloride resins are useful as secondary calibration standards for investigations in electron microscopy, light microscopy, light scattering, sedimentation studies and aerosol studies. Latex paint formulation theories state that there are reasons for believing that a film-forming, uniform particle size vinylidene chloride latex resin is desirable to minimize the problems of stability and reproducibility of flow properties of latex paints. U.S. Patent 2,553,916 teaches that powders of synthetic resins that are composed of a mixture of two uniform particle size resins with the larger uniform particle size resin having a particle size at least six times the size of the smaller uniform particle size resin requires a minimum of plasticizer. U.S. Patent 2,553,916 states that it is advantageous in synthetic resin paste formulations to bring about a paintable or pourable condition with a minimum of liquid plasticizer. A large uniform, particle size vinylidene chloride latex resin is useful in paper treatment for reducing the depth of resin impregnation.

It will become apparent from the discussion of our invention that our uniform particle size vinylidene chloride resins have utility in the aforementioned areas.

The use of materials commonly referred to as "insoluble soaps," "heavy metal soaps," "insoluble metal soaps," "polyvalent metal soaps," "driers" and "metallic soaps" as the sole emulsifiers for the emulsion polymerization of vinylidene chloride or mixtures of vinylidene chloride with other polymerizable monomers was not known at the time of the present invention. The prior art does not teach or suggest that such soaps would have any utility, per se, in the polymerization reaction. There is no indication in the prior art that such materials would have any value as emulsifiers in any aqueous system particularly in view of their known very limited solubility in water. The "polyvalent insoluble soaps" embodied herein are not regarded as emulsifiers for water systems. This invention, which is discussed in more detail below, is indeed unexpected in view of the prior art.

It is an object of this invention to provide vinylidene chloride resins that have spherical, uniform size particles. Another object of this invention is to provide spherical, uniform particle size vinylidene chloride resins in a single step polymerization. Still another object is the provision of a method for preparing spherical, uniform particle size vinylidene chloride resins having a predetermined particle size.

The following description and examples will show the accomplishment of the foregoing and other objects.

We have discovered a method for preparing spherical, uniform particle size polyvinylidene chloride resins comprising conducting the polymerization of a monomer mixture of more than 50% and preferably from 65 to 100% by weight of vinylidene chloride and from 0 to less than 50% and preferably from 0 to 35% by weight of at least one other polymerizable monomer in water with agitation in the presence of an insoluble soap as the sole emulsifier.

Thus, the vinylidene chloride resins included herein are homopolymers of vinylidene chloride, copolymers and interpolymers of at least 65% by weight of vinylidene chloride and up to 35% by weight of one or more various other vinyl monomers copolymerizable with vinylidene chloride.

Included in the group of various other vinyl monomers copolymerizable with vinylidene chloride are those selected from the class consisting of

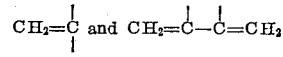

groupings. Such vinyl monomers include vinyl halides such as vinyl chloride, vinyl bromide, vinyl fluoride, vinylidene bromide, vinylidene fluoride, chlorotrifluoroethylene, 1,2-dichloroethylene, and the like; the acrylate and methacrylate esters such as methyl acrylate, ethyl acrylate, propyl acrylate, isopropyl acrylate, the butyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylates, cyclohexyl methacrylates and the like; the dienes such as 1,3-butadiene, 1,3-butadiene having the 2 position substituted with a member selected from the group consisting of halo atoms and alkyl groups of from 1 to 4 carbon atoms, 1,3-butadiene substituted at the 2 and 3 positions with members selected from the group consisting of halo atoms and alkyl groups of from 1 to 4 carbon atoms. Such substituted 1,3-butadienes include 2,3-dimethyl-1,3-butadiene, 2,3-dichloro-1,3-butadiene, 2-methyl-3-chloro-1,3-butadiene and the like; vinyl cyanides such as acrylonitrile, methacrylonitrile, fumaronitrile, maleonitrile, and the like and others; the vinyl esters such as vinyl acetate, vinyl propionate, vinyl butyrate, vinyl benzoate, vinyl laurate, isopropenyl acetate, isopropenyl caproate, and the like; the maleate and fumarate esters such as dimethyl maleate, diethyl fumarate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate, diphenyl fumarate, and the like; the vinyl aromatics such as styrene, chlorine substituted styrene, the vinyl toluenes, the vinyl xylenes, vinyl naphthalene, and the like; the monoolefins such as ethylene, propylene, the butylenes, the amylenes, the hexylenes, cyclohexene and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; the vinyl ketones such as vinyl methyl ketone, vinyl ethyl ketone, isopropenyl ketone and the like.

Most preferred are the interpolymers of from 65 to 100% by weight of vinylidene chloride and from 0 to 35% by weight of at least one other monomer selected from the group consisting of vinyl chloride,

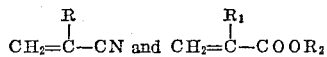

wherein R and $R_1$ are members of the class consisting of hydrogen and an alkyl group having from 1 to 4 carbon atoms and $R_2$ is a hydrocarbon group having from 1 to 12 carbon atoms. Even more preferred are the monomers in which $R_2$ is an alkyl group containing from 1 to 8 carbon atoms.

The metallic soaps or insoluble soaps useful as the sole emulsifiers in the present invention include the lithium and the polyvalent metal salts of saturated, unsaturated and substituted fatty acids. The polyvalent metal moieties of the soaps embodied herein include in general any metals of groups II, III and IV of the Mendeléeff periodic table and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic and the like. Most preferred are the monobasic saturated fatty acids having from 8 to 22 carbon atoms. The emulsifiers embodied herein are most useful in the range of from 0.01 part to 5 parts by weight (per 100 parts of monomer) and preferably from 0.1 to 2.0 parts.

Most preferred in this invention are the insoluble soaps having the formula

wherein A is an alkyl group having from 7 to 21 carbon atoms and M is a member selected from the group consisting of lithium, barium, calcium, magnesium, cadmium, zinc, lead, tin and aluminum and $n$ is a whole number equal to the valence of M.

The vinyl polymer latices of fine particle dispersions produced by the process of this invention generally contain polymer existing as uniform, spherical particles having average diameters of from 0.1 to 10 microns and more preferably from about 0.1 to 3 microns in diameter.

The process of this invention is carried out conveniently in glass, quart "soda pop" bottles or other polymerization apparatus, preferably in the substantial absence of elemental oxygen and in the presence of a free-radical initiator at a temperature of about 100° C. or below, the temperature being measured at standard pressure. Thus, with super-atmospheric pressure the reaction may be carried out at temperatures greater than 100° C. The polymerization reaction can be carried out at atmospheric, sub-atmospheric or super-atmospheric pressure. Preferably, the polymerization is carried out at a reaction temperature in the range of from about 30° to 100° C. In general, the polymerization temperature chosen does not influence the particle size of the product, but those skilled in the art know lower temperatures tend to produce higher molecular weight polymers and higher temperatures tend to produce lower molecular weight polymers. It is also known that lower molecular weight resins soften at somewhat lower temperatures than their higher molecular weight analogues.

The free-radical initiators useful in the present invention include chemicals which decompose to produce free radicals under the foregoing reaction conditions as well as various forms of actinic radiation such as ultraviolet light, X-rays and the various types of nuclear radiation. Preferred as free-radical initiators in the present invention are commonly used polymerization initiators including the peroxides, azo compounds and redox catalysts. Most preferred are the water-soluble initiators such as potassium persulfate, ammonium persulfate, sodium persulfate, hydrogen peroxide, potassium perphosphate and the like as well as the well-known water-soluble redox initiators. The free-radical initiator is most useful in the range of from about 0.01 part to 3 parts per hundred parts of monomer and more preferably from 0.05 part to 0.3 part per hundred of monomer.

Conventional emulsion polymerization buffers may be employed in the present process although they are not necessary for the practice of this invention. Buffers such as ammonia, $NaHCO_3$, $NH_4HCO_3$ and other water-soluble salts generally give slightly more stable latices. The pH of the polymerization mixture does not appear to be critical and it can be varied from about 2 to 10.

In the novel polymerization process embodied herein the best results are obtained and the most stable latices result when mild but thorough agitation is employed. Stated differently, the most stable latices result from the process embodied herein when good mixing with low shear stirring is employed during the course of the polymerization. The use of high shear stirring is actually a convenient method to coagulate the latex if it is desired to do so either during or after completion of the polymerization reaction. The use of conventional emulsifiers as additional stabilizers after the completion of the polymerization reaction is within the scope of the present invention. Polymers resulting from the present process may be prepared in low or high conversion in a manner known to those skilled in the art. It is essential that the polymerization be carried to completion in the presence of the insoluble soaps as sole emulsifier, however.

The vinylidene chloride resins embodied herein may be isolated from their latices by the use of conventional methods of coagulation with such agents as sodium chloride, calcium acetate, sodium carbonate, alcohols, hydrochloric acid, sulfuric acid and the like by procedures well known in the art. The vinylidene chloride resin latices embodied herein can also be heat coagulated, shear coagulated, freeze coagulated, spray dried or coagulated through water evaporation in film forming vinylidene chloride resins. The coagulated resin is conveniently isolated by filtration, centrifugation or decantation and may be dried in conventional drying equipment.

The insoluble soaps embodied herein may be used per se or they may be generated in situ in the polymerization mixture. The insoluble soap such as barium laurate may be generated in situ, for instance, by adding to the aqueous polymerization mixture substantially stoichiometric quantities of barium hydroxide and lauric acid.

The vinylidene chloride resins embodied herein are distinguished from other conventional emulsion type vinylidene chloride resins in that the latter are not spherical, uniform particle size resins. For example, polyvinylidene chloride prepared with a conventional soluble soap emulsifier will usually have broad particle size distribution with the average particle size generally less than 3000 A.

In the following examples which will serve to illustrate the process of the invention, the amounts of ingredients are expressed in parts by weight unless otherwise indicated.

EXAMPLE I

The polymerization was run in a one quart "soda pop" bottle. Into the bottle, under a nitrogen atmosphere, the following were charged: 300 parts of demineralized water, 0.50 part of finely-divided barium laurate, 100 parts of highly purified vinylidene chloride monomer and 0.10 part of potassium persulfate initiator. The bottle was capped, placed in a protective, metal shield, and then positioned in a rotating 50° C. polymerization bath. The bottle was rotated at 50° C. for 15.5 hours. At the end of this period the bottle was removed from the bath, cooled and uncapped.

The resulting polyvinylidene chloride polymer was largely in latex form. A small amount of the latex, due to the type of agitation used, was found to be coagulated.

This coagulated portion of the latex was found in the form of a thin coating on the latex surface.

amounts of the components in each recipe are expressed in parts by weight.

*Table 1*

| Ingredients | A | B | C | D | E | F |
|---|---|---|---|---|---|---|
| Vinylidene chloride | 100 | 100 | 100 | 100 | 100 | 100 |
| Demineralized water | 300 | 300 | 300 | 300 | 300 | 300 |
| Potassium persulfate | 0.25 | 1.0 | 0.15 | 0.3 | 0.2 | 0.07 |
| Calcium palmitate | 0.8 | | | | | |
| Lead stearate | | 0.7 | | | | |
| Cadmium stearate | | | 0.6 | | | 0.5 |
| Magnesium myristate | | | | 0.4 | 0.5 | |
| Barium laurate | | | | | 0.5 | |
| Lithium stearate | | | | | | 0.2 |
| pH | 4.2 | 2.9 | 2.9 | 2.4 | 6.6 | 1.9 |
| Percent conversion | 85 | 84 | 85 | 84 | 87 | 84 |
| Particle size, A | ¹5,000 | ¹5,000 | ¹6,200 | ¹6,000 | ²6,500 | ¹4,500 |

¹ Uniform.
² Fairly uniform.

A small sample of the latex was diluted with distilled water and the particle size was determined by depositing a small amount of the diluted latex on a copper grid, carefully drying and taking an electron photomicrograph of the deposited particles using a Philips (Model E. M. 100B) electron microscope. The latex particles were found to be uniform spheres having diameters of about 4000 A. (0.40 micron).

The remaining latex was coagulated with calcium acetate. The resulting polymer was washed with methanol and then distilled water. The washed polymer was next vacuum dried for eight hours at 50° C. From the weight of the dried polymer it was calculated that the polymerization had gone to high conversion.

This polymerization was nearly the same as the preceding one except that the barium laurate emuslifier was replaced by a commonly used, soluble emulsifier, sodium lauryl sulfate. The sodium lauryl sulfate was obtained from the E. I. du Pont de Nemours & Co. under the trade name "Duponol-C."

In the same manner as in the foregoing polymerization, 300 parts demineralized water, 0.50 part finely-divided sodium lauryl sulfate emulsifier, 0.15 part potassium persulfate initiator and 100 parts highly purified vinylidene chloride monomer were added to a one quart soda pop bottle under a nitrogen atmosphere.

The bottle was capped and placed in a protective metal shield. The bottle was placed in a 50° C. rotating polymerization bath. The bottle was rotated for 16.0 hours at 50° C. At the end of this period the bottle was removed from the bath, cooled and uncapped.

The resulting polymer was obtained almost entirely as a latex. The latex was screened through a 100 mesh sieve to remove any coagulated polymer.

A small sample of the screened latex was subjected to particle size analysis by the procedure shown above. The latex particle size was not uniform. The particle size distribution ranged between 400 A. to 1400 A. (or 0.04–0.14 micron).

The remaining latex was coagulated, washed and dried in a manner similar to that shown above. From the weight of the dried polymer a high conversion (95–96%) was calculated.

EXAMPLE II

A series of polyvinylidene chloride homopolymers were prepared according to the procedure of EXAMPLE I. This series was designed to show the use of various insoluble soaps and insoluble soap mixtures as the sole emulsifiers in the polymerization of vinylidene chloride.

Table 1 indicates the components of the recipes, pH of the resulting latices and the particle size of the latices. All members of this series were polymerized at 50° C. for 24 hours in a rotating polymerization bath that tumbled the bottles at 30 revolutions per minute. The

EXAMPLE III

A copolymer was prepared according to the procedure of Example I from the following recipe:

| | |
|---|---|
| Vinylidene chloride (purified) | 65 |
| Vinyl chloride (purified) | 35 |
| Potassium persulfate | 0.10 |
| Calcium stearate | 0.50 |
| Demineralized water | 300 |

The polymerization step described in Example I was used. A polymerization temperature of 50° C. was employed. The polymerization was carried to high conversion with the formation of a latex. Electron microscope analysis of the latex revealed that the latex was composed of spherical particles that were uniform in diameter.

EXAMPLE IV

A copolymer was prepared according to the procedure of Example I from the following recipe:

| | |
|---|---|
| Vinylidene chloride (purified) | 65 |
| Ethyl acrylate (purified) | 35 |
| Potassium persulfate | 0.10 |
| Magnesium laurate | 0.50 |
| Demineralized water | 300 |

The polymerization step described in Example I was used. A polymerization temperature of 50° C. was employed.

Particle size determination with the electron microscope showed that the resulting latex of this copolymerization was composed of spherical, uniform particles.

This polymerization was repeated except that ethyl acrylate was replaced by methyl methacrylate and the magnesium laurate emulsifier was replaced by lead stearate. The recipe was otherwise the same and the polymerization procedure was the same.

The vinylidene chloride-methyl methacrylate copolymerization also resulted in a uniform particle size latex.

EXAMPLE V

Another copolymer was prepared according to the procedure of Example I from the following recipe:

| | |
|---|---|
| Vinylidene chloride (purified) | 65 |
| Acrylonitrile | 35 |
| Potassium persulfate | 0.10 |
| Lithium laurate | 0.25 |
| Demineralized water | 300 |

The polymerization step described in Example I was used. A polymerization temperature of 50° C. was employed. Electron microscope analysis revealed that the resulting latex was composed of spherical, uniform particle size particles.

We claim:
1. The method for preparing a uniform particle size polyvinylidene chloride resin comprising polymerizing a mixture of from 65 to 100% by weight of vinylidene chloride and from 0 to 35% by weight of at least one other monomer selected from the group consisting of vinyl chloride,

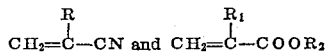

wherein R and $R_1$ are members of the class consisting of hydrogen and an alkyl group having from 1 to 4 carbon atoms and $R_2$ is a hydrocarbon group having from 1 to 12 carbon atoms in the presence of from 0.01 part to 3.0 parts per 100 parts of the monomers of a free-radical catalyst and from 0.01 to 5.0 parts per 100 parts of the monomers of an insoluble soap as the sole emulsifier having the structure $(A-COO)_nM$ wherein A represents an alkyl group having from 7 to 21 carbon atoms and M is a member selected from the group consisting of lithium, barium, calcium, magnesium, cadmium, zinc, lead, tin and aluminum and $n$ is a whole number equal to the valence of M, with agitation in the substantial absence of oxygen at a temperature below about 100° C.

2. The method for preparing a uniform particle size polyvinylidene chloride resin comprising polymerizing vinylidene chloride in water in the presence of from .01 to 3.0 parts by weight per 100 parts of vinylidene chloride of a free-radical catalyst and as the sole emulsifier from 0.01 to 5.0 parts by weight per 100 parts of vinylidene chloride of at least one insoluble soap having the structure $(A-COO)_nM$ wherein A represents an alkyl group having from 7 to 21 carbon atoms and M is a member selected from the group consisting of lithium, barium, calcium, magnesium, cadmium, zinc, lead, tin and aluminum and $n$ is a whole number equal to the valence of M, with agitation in the substantial absence of oxygen at a temperature below about 100° C.

3. The method for preparing a uniform particle size polyvinylidene chloride resin comprising polymerizing vinylidene chloride in water in the presence of from .05 to 0.3 part by weight per 100 parts of vinylidene chloride of a free-radical catalyst and as the sole emulsifier from 0.1 to 2.0 parts by weight per 100 parts of vinylidene chloride of barium laurate with agitation in the substantial absence of oxygen at a temperature of from about 30° C. to 100° C.

4. The method for preparing a uniform particle size polyvinylidene chloride resin comprising polymerizing a monomer mixture of 65% by weight of vinylidene chloride and 35% by weight of vinyl chloride in water in the presence of from .05 to 0.3 part by weight per 100 parts of said mixture of a free-radical catalyst and as the sole emulsifier from 0.1 to 2.0 parts by weight per 100 parts of said mixture of calcium stearate with agitation in the substantial absence of oxygen at a temperature of from about 30° C. to 100° C.

5. The method for preparing a uniform particle size polyvinylidene chloride resin comprising polymerizing a monomer mixture of 65% by weight of vinylidene chloride and 35% by weight of ethyl acrylate in water in the presence of from .05 to 0.3 part by weight per 100 parts of said mixture of a free-radical catalyst and as the sole emulsifier from 0.1 to 2.0 parts by weight per 100 parts of said monomer mixture of magnesium laurate with agitation in the substantial absence of oxygen at a temperature of from 30° C. to 100° C.

6. The method for preparing a uniform particle size polyvinylidene chloride resin comprising polymerizing a monomer mixture of 65% by weight of vinylidene chloride and 35% by weight of acrylonitrile in water in the presence of from .05 to 0.3 part by weight per 100 parts of said mixture of a free-radical catalyst and as the sole emulsifier from 0.1 to 2.0 parts by weight per 100 parts of said monomer mixture of lithium laurate with agitation in the substantial absence of oxygen at a temperature of from 30° C. to 100° C.

7. The method for preparing a uniform particle size polyvinylidene chloride resin comprising polymerizing a monomer mixture of 65% by weight of vinylidene chloride and 35% by weight of methyl methacrylate in water in the presence of from .05 to 0.3 part by weight per 100 parts of said mixture of a free-radical catalyst and as the sole emulsifier from 0.1 to 2.0 parts by weight per 100 parts of said monomer mixture of lead stearate with agitation in the substantial absence of oxygen at a temperature of from 30° C. to 100° C.

8. The method for preparing a uniform particle size vinylidene chloride resin in aqueous emulsion comprising polymerizing a monomer mixture of from 65 to 100% by weight of vinylidene chloride and from 0 to 35% by weight of at least one other monomer copolymerizable with vinylidene chloride and which contains a grouping selected from the class consisting of

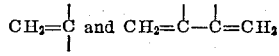

in water with agitation in the presence of an insoluble soap as the sole emulsifier, said soap being the salt of a polyvalent metal and a fatty acid having from 8 to 22 carbon atoms.

9. The method for preparing a uniform particle size vinylidene chloride resin in aqueous emulsion comprising polymerizing in the presence of a free-radical catalyst and in the substantial absence of oxygen, at a temperature below about 100° C., a monomer mixture of from 65 to 100% by weight of vinylidene chloride and from 0 to 35% by weight of at least one other monomer having a

grouping and copolymerizable with vinylidene chloride in water with agitation in the presence of from 0.01 to 5 parts per 100 parts by weight of monomer of an insoluble soap as the sole emulsifier, said soap being the salt of a polyvalent metal and a fatty acid having from 8 to 22 carbon atoms.

10. The method of claim 9 wherein the insoluble soap is a salt of barium and a fatty acid having from 8 to 22 carbon atoms.

11. The method of claim 9 wherein the insoluble soap is a salt of aluminum and a fatty acid having from 8 to 22 carbon atoms.

12. The method of claim 9 wherein the insoluble soap is a salt of cadmium and a fatty acid having from 8 to 22 carbon atoms.

13. The method of claim 9 wherein the insoluble soap is a salt of calcium and a fatty acid having from 8 to 22 carbon atoms.

14. The method of claim 9 wherein the insoluble soap is a salt of lead and a fatty acid having from 8 to 22 carbon atoms.

15. The method of claim 9 wherein the insoluble soap is a salt of magnesium and a fatty acid having from 8 to 22 carbon atoms.

16. The method of claim 9 wherein the insoluble soap is a salt of tin and a fatty acid having from 8 to 22 carbon atoms.

17. The method of claim 9 wherein the insoluble soap is a salt of zinc and a fatty acid having from 8 to 22 carbon atoms.

References Cited by the Examiner
UNITED STATES PATENTS

| | | | |
|---|---|---|---|
| 2,485,616 | 10/49 | Long et al. | 260—92.8 |
| 2,569,447 | 10/51 | Borglin et al. | 260—92.8 |
| 2,934,529 | 4/60 | Van Dijk | 260—92.8 |
| 2,981,724 | 4/61 | Holdsworth | 260—92.8 |

JOSEPH L. SCHAFER, *Primary Examiner.*

J. R. LIBERMAN, WILLIAM H. SHORT, *Examiners.*